March 9, 1943.   A. LE R. SPRECKER ET AL   2,313,179
COMPUTING SCALE
Filed April 1, 1942   6 Sheets-Sheet 2

INVENTORS
Alfred L. Sprecker
LeRoy S. Smithers
BY
ATTORNEY

March 9, 1943.   A. LE R. SPRECKER ET AL   2,313,179
COMPUTING SCALE
Filed April 1, 1942   6 Sheets-Sheet 4

PRINT LINE

Patented Mar. 9, 1943

2,313,179

UNITED STATES PATENT OFFICE 2,313,179

COMPUTING SCALE

Alfred Le Roy Sprecker, Freeport, and Le Roy S. Smithers, Kew Gardens, N. Y., assignors to International Business Machines Corporation, New York, N. Y., a corporation of New York Application April 1, 1942, Serial No. 437,138

19 Claims. (Cl. 265—5)

This invention relates to combination calculating and recording scales, and its general object is to provide novel recording means in combination with a calculating scale of the type disclosed in Patent No. 1,650,227.

This type of calculating scale comprises two separately actuated weighing structures, cooperation between which is afforded by intersection of their respective indicators. In a particular displaced position of one such indicator, it is intersected at progressively spaced points by the other indicator according to progressive movement of the latter indicator. Such intersection points may be graduated to provide computation measurements indicative of relationship between the particular portion of the first indicator and the progressive positions of the other indicator. For instance, a mass of pieces may be applied to the weighing structure including the first indicator to displace the latter to a position corresponding to the weight of the mass. The other indicator may be moved to a position corresponding to the weight of one such piece, and the intersection of the indicators will then indicate the count of pieces in the mass. The second indicator will be moved to different positions depending on the weight of the piece and will intersect the first indicator at different points denoting different counts, the count being dependent, for a given weight of the mass, on the weight of an individual piece in the mass. For a given weight of a piece, the number of pieces in a mass will differ in accordance with the weight of the mass in response to which the first indicator is displaced. Hence, in any given position of the second indicator corresponding to the weight of an individual piece, it will intersect the first indicator at different points depending on the variable displacement of the latter indicator. These different points of intersection will correspond to different counts. Thus, the intersection points of the indicators vary according to displacements of the two indicators. In the scale disclosed in Patent No. 1,650,227, the first indicator is displaced rectilinearly according to the weight of the mass while the second indicator is displaced angularly according to the weight of an individual piece. The relation between points of intersection of the indicators, with the second indicator in a given angular position, as the first indicator moves rectilinearly is determined by the principle of similar triangles. In general, it may be stated that this type of calculating scale comprises two indicating structures independently displaceable according to two terms of a computation and denoting the result of the computation by their intersection.

An object of the invention is to provide means for automatically reading out singly differential computation result values from a computation result determining means comprising intersecting separate devices, each independently movable under control of weighing mechanisms in accordance with separate but related terms or factors of the computation.

Another object of the invention resides in the provision of means for setting registering or recording means separately from but under control of the independently displaced structures of a calculating scale of the aforesaid type, with such setting denoting the result of the computation involving the two terms according to which the said structures are displaced.

Another object of the invention is to provide means for setting recording means according to the correlation of the independently displaced weighing structures of said type of calculating scale, with the setting means including elements providing different intersection or result reference points and means for reading out such points.

Another object of the invention is to provide such recording means as will operate automatically to set recording means according to operation of a calculation scale of said type.

Another object of the invention is to provide means to set the recording means according to operation of said type of calculating scale, with such setting means including separate followers, one for each of the independently displaceable structures of the scale and affording intersection points which may be read out by positioning the recording means according to such points.

Other objects of the invention will be pointed out in the following description and claims and illustrated in the accompanying drawings, which disclose, by way of example, the principle of the invention and the best mode, which has been contemplated, of applying that principle.

The calculating scale

Figure 1:
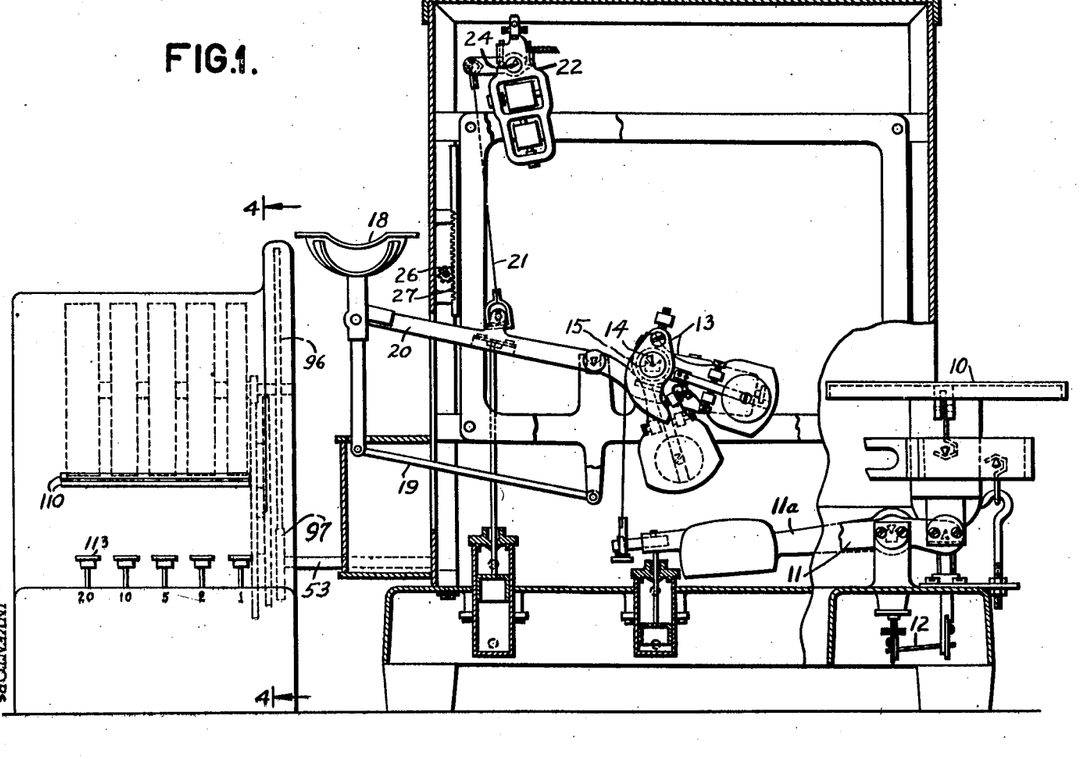
Fig. 1 is a front view of the scale and recording means, with the scale being shown largely in section.

Fig. 1 shows the independently displaceable weighing structures, but omits the usual indicators and charts connected therewith, since the invention may be practiced independently thereof. In actual commercial use, the charts and indicators may be included to supplement the automatic result recording or registering means.

The weighing structure to weigh the mass of pieces to be counted or the goods of which the cost is to be computed may be referred to as the main weighing structure. The other weighing or indicating structure may be referred to as the unit weighing or indicating structure or simply as the unit structure.

Figure 2:
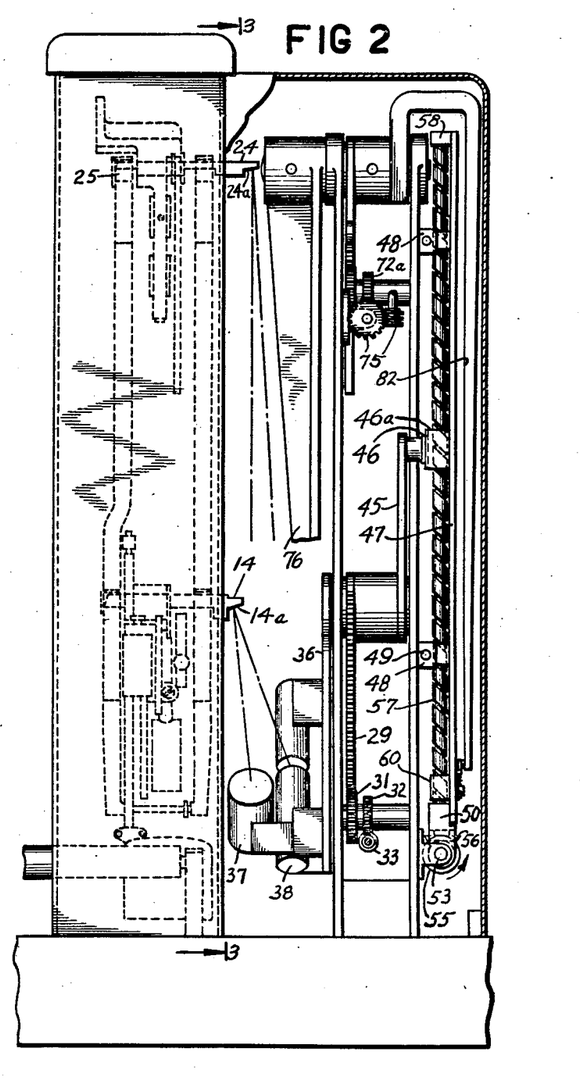
Fig. 2 is an end view of the scale with the rear part in section to show the follower mechanism.
Figure 3:
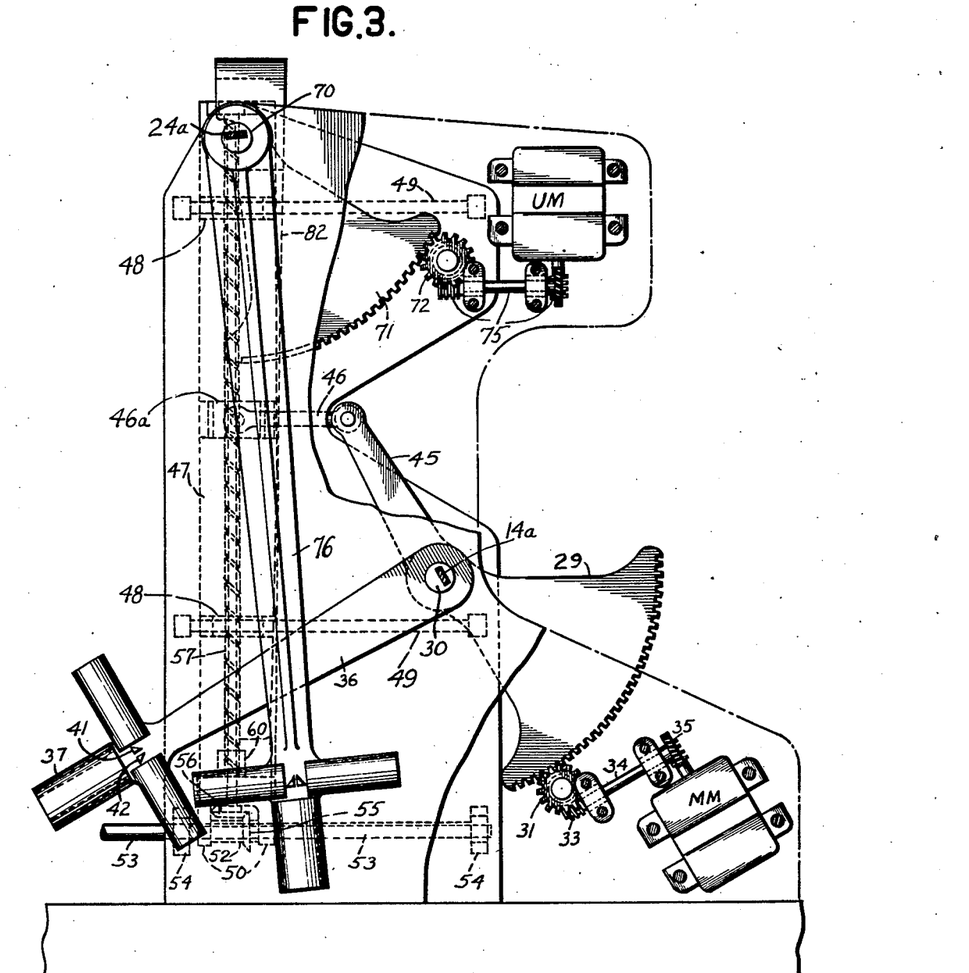
Fig. 3 is a section on lines 3—3 of Fig. 2.

The main weighing structure includes the platform 10 to receive the main load consisting of a mass of pieces to be counted. Platform 10 is carried by one arm of a base lever 11 and the usual check link 12. An opposite arm 11a of lever 11 is connected by a tape to a main pendulum assembly 13 rockably mounted on the frame. To mount the pendulum assembly, it is provided with a pivot 14 having a knife edge bearing engagement with the usual fixed bearings 15. The right hand end of pivot 14, as viewed in Fig. 2, is formed with a polished mirror surface 14a. Obviously, the mirror surface 14a may be replaced by an attached mirror, and the mirror surface will be referred to simply as a mirror. The pendulum assembly 13 and mirror 14a assume variable angular positions coresponding to variable weights of loads placed on platform 10. In a manner explained later, mirror 14a serves as a positioning control for a follower which may be referred to as a main follower.

The unit weighing structure comprises a unit pan 18 carried by parallel levers 19 and 20. Lever 20 is connected by a tape 21 to a pendulum assembly 22 rockably mounted on the frame. To mount this pendulum assembly, it carries a pivot 24 having knife edge bearing engagement with the usual fixed bearings 25 (Fig. 2). The right hand end of pivot 24 (see Fig. 2) is formed with a polished mirror surface 24a which will be referred to simply as a mirror. In utilizing the calculating scale for count computing, one or more pieces such as contained in the main load are placed in unit pan 18. The pendulum assembly 22 and mirror 24a will be angularly displaced according to the weight of the load in the unit pan. In a manner explained later, the mirror 24a serves as a positioning control for a follower which may be referred to as the unit follower.

The pendulum assembly 22 and mirror 24a may be displaced manually to angular positions corresponding to different unit prices or unit count values. The means for manually displacing the assembly 22 and mirror 24a comprises a pinion 26 and a rack 27 meshed therewith. By turning pinion 26 in a suitable direction, rack 27 will be moved down. The lower end of the rack will engage lever 20 and actuate it so as to rock the pendulum assembly 22. The angular displacement of the pendulum assembly will be determined by the extent of rotation of pinion 26 and suitable known means may be provided to index the displacement in terms of unit prices or unit count values.

The follower means

The main and unit followers will now be described in detail with reference to Figs. 2, 3 and 5 to 8.

*The main follower.*—This follower comprises a gear segment 29 fixed to a shaft 30. Shaft 30 is coaxial with pivot 14 of the main weighing structure but is completely physically disconnected therefrom. Meshed with segment 29 is a pinion 31. Pinion 31 is rigid with a pinion 32, which is driven by a worm 33 on one end of a shaft 34 which is actuated through worm gearing 35 by a motor MM. Motor MM is normally at rest. When the main follower is to be moved to a position corresponding to a displaced position of the main weighing structure, motor MM is set in operation in a manner explained later and causes shaft 30 to turn until the main follower assumes a position matching the position of the main weighing structure. When this follower assumes the required position, operation of motor MM is automatically interrupted. The motor MM is of the reversible type and may actuate the follower in either of opposite directions. The direction in which the follower moves to follow the main weighing structure to a greater angular position may be referred to as the forward direction. The movement of the follower to follow the main structure to a lesser angular position may be referred to as the reverse direction. When the main follower is in a neutral or matching position with respect to the main weighing structure, it may be said to occupy a main load position; i. e., a position corresponding to and indicative of the weight of the load applied to platform 10.

Operation of motor MM is controlled by optical sensing means including mirror 14a and coacting elements of the main follower. These coacting elements are carried by an arm 36 fixed to shaft 30. The outer portion of arm 36 is in the general shape of a T. The leg of this T is provided with two separate housings 37 and 38 (see Fig. 2), housing 37 being disposed to the left of housing 38. Housing 37 encloses a lamp 39 and condenser lens 40 (shown only in the circuit diagram, Fig. 13). Housing 38 contains a photocell N (also shown only in Fig. 13). The cross arms of the T end of arm 36 each carry suitably housed photocells F and R (shown only in Fig. 13). Between the photocells F and R, arm 36 carries a pair of spaced mirrors 41 and 42 with oppositely inclined reflecting surfaces. The three photocells N, F and R are in the same general plane. The lamp 39 and lens 40 are in a different general plane to the left of the general plane of the photocells (as viewed in Fig. 2). With the main follower in matched relation to the main weighing structure, the light beam projected from the light source in housing 37 strikes mirror 14a at an angle such that this mirror reflects the beam through the space between mirrors 41 and 42 and strikes photocell N to activate it. When the main follower is behind the load or matched position, the light beam strikes the mirror 14a at an angle such that a reflected beam impinges upon mirror 41 which, in turn, reflects the beam to photocell F to activate it. When the main follower is ahead of the load position, the light beam is reflected by mirror 14a to mirror 42 which reflects it towards photocell R, activating the cell. In a manner explained later in the description of the circuits, activity of photocell F controls motor MM to move the main follower forward towards the load position, activity of cell R controls motor MM to return the follower back to load position, and activity of cell N causes motor M to stop so that the follower remains in load position.

Fixed to shaft 30 is an arm 45 connected by a link 46 to a bracket 46a suitably fixed to vertically elongated plate 47. Plate 47 is mounted to slide in a horizontal direction. The means for so mounting the plate 47 includes collar pieces 48 attached to the plate and surrounding fixed guide rods 49. The lower end of plate 47 has fixed to it a yoke 50 between the legs of which is journaled a sleeve 52 slidably keyed to a shaft 53. Shaft 53 is journaled in fixed bearing pieces 54. Sleeve 52 has fixed to it a bevel gear 55 meshed with a bevel gear 56 rigidly mounted on the lower end of a worm 57. The worm is vertically disposed and journaled in the yoke 50 and in a bearing piece 58 attached to the plate 47 at its upper end. In threaded coaction with worm 57 is a nut 60.

When shaft 30 rocks clockwise (Fig. 3), arm 45 and link 46 cause plate 47 to slide to the right. When shaft 30 rocks counterclockwise, the plate is moved to the left. All the parts carried by plate 47 partake of the rectilinearly slidable movements of the plate in a horizontal direction. Thus, worm 57, bevel gears 55 and 56, sleeve 52, and nut 60 all move with plate 47 in a horizontal direction. All these parts may be considered as parts of the main follower with the qualification that worm 57, sleeve 52, bevel gears 55 and 56, and nut 60 may be considered further as parts of coordinating means to read out a result position determined conjointly by both the main and unit follower means. When the main follower means moves to load position, the plate 47 and elements carried thereby move horizontally and bodily to a corresponding load position.

Figure 7:
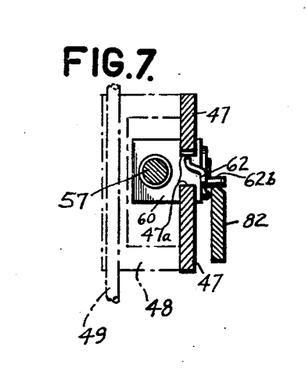
Fig. 7 is a section on lines 7—7 of Fig. 5.
Figure 8:
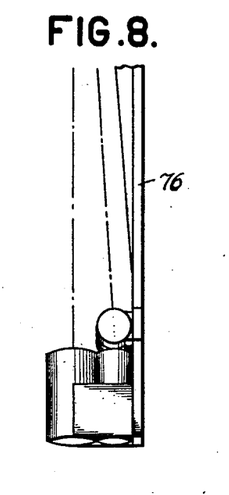
Fig. 8 shows the lower portion of the unit scale follower means, the remaining upper portion of which is shown in Fig. 2.

Plate 47 is formed with a vertical slot 47a (Fig. 7). Nut 60 has a reduced portion which passes through slot 47a. The shoulders of the nut at opposite ends of the reduced portion about the front and back faces of plate 47 to prevent rotation of the nut. The back of the nut pivotally carries a pawl 62 provided with a nose which projects into the slot 47a and is adapted to coact with ratchet teeth 47b formed along one longitudinal edge of the slot. The ratchet teeth are spaced according to successive count increments.

Pawl 62 is provided with a roller or stud 62b. When pawl 62 is in normal position, the left side of roller 62b is in line with the smooth side of slot 47a (as viewed in Figs. 5 and 6). This smooth side of slot 47a may be referred to as the main index edge. The pawl is held in normal position, in which its nose is disengaged from the ratchet teeth 47b, by a light spring 64 connected to the lug 62c and to the back of the nut. A stop pin 65 on the back of the nut engages lug 62c to define the normal position of pawl 62. In a manner explained later in the description of the recording means, the nut 60 is moved vertically along the slot in plate 47. During such travel of the nut, the pawl 62 remains in normal position with its nose disengaged from ratchet teeth 47b and with roller 62b moving in a vertical path, the left side of which (as viewed in Figs. 5 and 6) is in line with the main index edge; i. e., the left, smooth side of slot 47a.

*Unit follower means.*—The unit follower means follows the unit weighing structure to its load position. The unit follower means comprises a shaft 70 entirely physically disconnected from but coaxial with pivot 24 of the pendulum of the unit weighing structure. Fixed to shaft 70 is a gear segment 71. Gear segment 71 is meshed with a pinion 72 rigid with a pinion 72a driven through gearing and shafting generally designated 75 by a motor UM. Also fixed to shaft 70 is an arm 76, the outer end of which carries an optical and photocell assembly similar to the assembly carried by the main follower arm 36 and coacting with mirror 24a in the same way as the photocell and optical assembly of the main follower coacts with mirror 14a. Thus, motor UM will be actuated in a forward or reverse direction to cause follower shaft 70 to rock through the same angle as the mirror 24a until the unit follower assumes unit load position.

The unit follower means includes a depending arm 82 fixed to shaft 70. When the unit follower means follows the unit weighing structure to unit load position, arm 82 rocks to an angular position corresponding to the load. The right hand edge of arm 82 (as viewed in Figs. 5 and 6) may be referred to as the units factor index edge.

Figure 5:
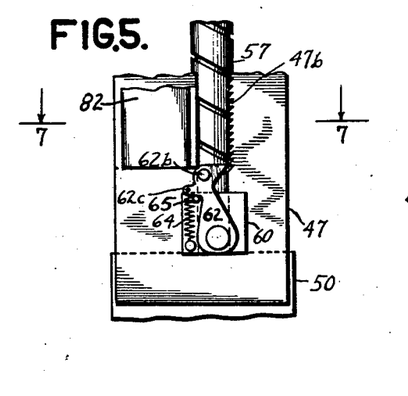
Fig. 5 is a rear, detail view on an enlarged scale of a portion of the followers and the means for reading out their related, intersecting positions and shows these parts in home positions.

*Interrelation between main and unit follower means.*—When the unit and main follower means are both in zero load positions, the index edge of arm 82 is vertically disposed and in line with the index edge of slot 47a of plate 47 (see Fig. 5). Were the nut 60 to be moved at this time, the roller 62b of pawl 62 would ride freely along the index edge of arm 82. However, it is not intended to move nut 60 until both the main and unit weighing structures and their follower means have been displaced from zero load positions to significant load positions. When such displacement has been effected, the arm 82 assumes an angular position corresponding to the unit load, while plate 47 and the parts carried thereby including nut 60 assume a position corresponding to the main load and horizontally to the right of the zero main load position, as viewed from the front (see Fig. 3). In these displaced positions of arm 82 and plate 47, their index edges cross at a point corresponding to the computed result; e. g., the count. Assuming the index edges of arm 82 and plate 47 to be in crossing relation, the nut 60 will be moved upwardly until roller 62b strikes the index edge of arm 82 at the crossing point of the index edges (see Fig. 6). When this occurs, the pawl 62 is forced clockwise (Fig. 6) against resistance of light spring 64 and the pawl nose is forced between a pair of teeth 47b in plate 47. The nut is thereby locked in a position corresponding to the crossing point of the index edges of the arm 82 and plate 47. By forcing the pawl nose into a notch, the nut 60 is locked in a position corresponding to an even graduation of the computed result; e. g., the count. Further, as the nut 60 is locked in position, the pressure of roller 62b against the index edge of arm 82 is relieved, avoiding any tendency for the nut to continue upward travel while at the same time pressing arm 82 backward to the extent of play in the teeth of drive gearing 71, 72, and 75 of the arm.

Figure 6:
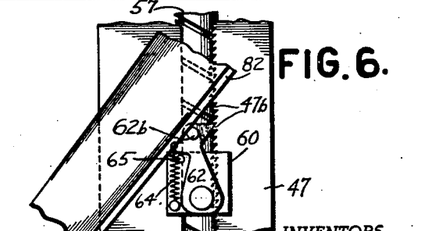
Fig. 6 is a rear, detail view of the parts shown in Fig. 5 but in different positions.

The point at which the index edges of arm 82 and plate 47 cross depends both on the weight of the unit load and on the weight of the main load. Thus, the crossing point of the index edges corresponds to the result of a computation in which the unit and main loads enter as terms. For instance, in computing counts, the crossing points correspond to the counts of pieces in the main load. As explained before, the nut 60 will travel upwardly to the crossing point where roller 62b will encounter the index edge of the arms 82 as a result of which the nose of pawl 62 will enter a notch 47b in the slot 47a of plate 47. This notch corresponds to an even figure of the count. The notches, in descending order, correspond to increasing computation results. For instance, considering the values of the notches when one piece is in the unit pan, the range of counts in the illustrated embodiment is from 0 to 500. When the unit weighing structure stays in zero load position so that follower arm 82 remains in vertical position, it permits the nut 60 to move to its upper limit where it is stopped by engagement with bearing piece 58. This upper limit position of the nut corresponds to a zero count. The next lower position of the nut corresponds to count value 2, and so on in increments of 2 to the lowest notch which corresponds to count value 500. The number of pieces in the main load is inversely proportional to the weight of the unit load since the less an individual piece weighs, the greater is the number of such pieces in a given mass of pieces acting on the main weighing structure. Conversely, the more an individual piece weighs, the smaller is the number of pieces in a given mass. The greater the weight of a unit load, the greater is the angle of displacement of unit follower arm 82. Thus, in any given position of main follower plate 47, the index edge of arm 82 will cross the index edge of plate 47 at progressively higher points for progressively greater weights of the unit load. Correspondingly, the nut 60 will move to higher positions and the pawl nose will be set in higher notches. Such higher notches correspond to smaller counts. The less the weight of a unit load, the lower is the angular position of arm 82 and the lower its crossing point with plate 47. Correspondingly, nut 60 will have less upward travel and the pawl nose will be set in a lower notch corresponding to a higher count. Further, the greater the weight of a mass of pieces, the further to the right (Fig. 3) will be the displaced position of plate 47. In any given angular position of unit follower arm 82, its index edge will be crossed by lower points of the index edge of plate 47 as the plate moves further to the left, as viewed from the rear (Fig. 6). Accordingly, nut 60 will have a smaller upward travel and the pawl nose will be set in a lower notch dependent on the displacement of the plate 47 and the angular position of arm 82. The lower the notch, the greater is the corresponding count as is consistent with the fact that the greater the main load, the greater is the count for any given unit load.

Thus, the upward travel of nut 60 is inversely proportional to the count.

Result reading and recording means

Figure 4:
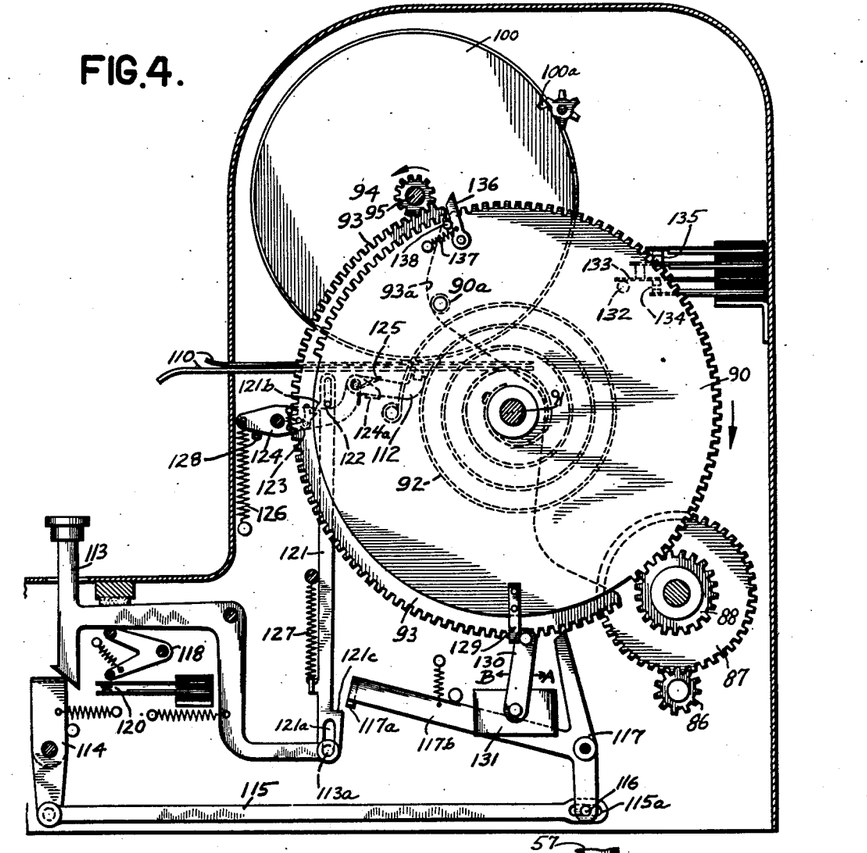
Fig. 4 is a section on lines 4—4 of Fig. 1.

After both the unit and main followers have assumed their load positions, means are set in motion to move nut 60 upwardly to the crossing point of the two load followers and to set type wheels accordingly. Referring to Fig. 4, the means for effecting the movement of nut 60 and for setting the type wheels comprises a motor RM (shown only in Fig. 13) which through suitable gearing rotates a pinion 86. Pinion 86 drives a gear 87 rigid with a smaller gear 88 meshed with a gear disk 90 mounted on a shaft 91. One end of a convolute spring 92 is fastened to the hub of gear 90. The other end of this spring is fastened to a generally semi-circular gear disk 93. The gear disk 93 has a curved edge 93a held against a pin 90a on disk 90 by spring 92. When the gear disk 90 is rotated by motor RM, it moves clockwise (Fig. 4) and disk 93 follows under the influence of spring 92. The teeth of gear disk 93 mesh with a pinion 94 fixed to a type wheel shaft 95. Shaft 95 has fixed to it a gear 96 (see Fig. 1) which meshes with a pinion 97 fixed to one end of previously mentioned shaft 53 (see also Fig. 3). Slidably keyed to shaft 53, as previously described, is sleeve 52. Thus, in any horizontally displaced position of plate 47 and sleeve 52, rotation of shaft 53 will effect rotation of the sleeve. Through bevel gears 55 and 56, sleeve 52 rotates worm 57, causing nut 60 to travel upwardly. When the nut is arrested at the crossing point of the index edges of arm 82 and plate 47, the rotation of worm shaft 57 is arrested, likewise arresting its driving train beginning with spring-driven gear disk 93. The motor-driven gear disk 90 which, through spring 92, actuates gear disk 93 continues to rotate, however, to complete a predetermined range of travel. When the nut 60 and its drive train is arrested, the type wheel shaft 95 is also arrested. The extent of rotation of shaft 95 is thus proportional to the extent of upward travel of nut 60.

Figure 10:
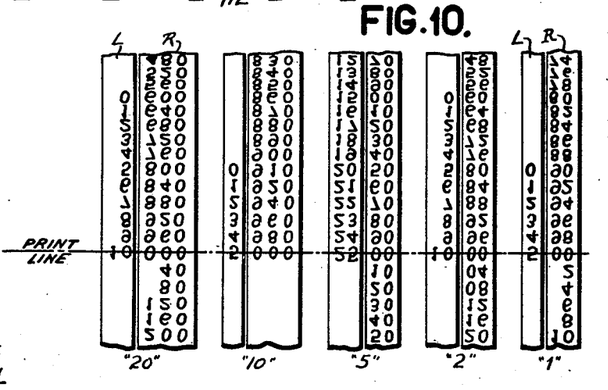
Fig. 10 is a bottom view of the portions of the type wheels as they appear at the printing position and is taken in the direction of arrows 10—10 of Fig. 9.

Five sets of type wheels are mounted on shaft 95. In Fig. 10, the sets are designated "1," "2," "5," "10" and "20" denoting their relation to the number of pieces in the unit pan 18. The set "1" is used to print the count when one piece is in the unit pan, the set "2" when two pieces are in the unit pan, the set "5" when five pieces are in the unit pan, and so on. Each set comprises a type wheel R fixed to the shaft 95 and a type wheel L rotatably mounted on the shaft and driven through carry means, described later, from the associated type wheel.

Figure 9:
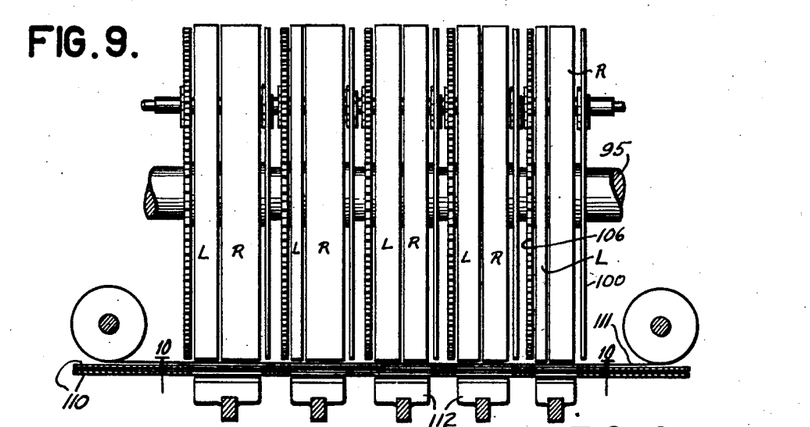
Fig. 9 is a front, sectional view of the computation result type wheels and related elements.
Figure 11:
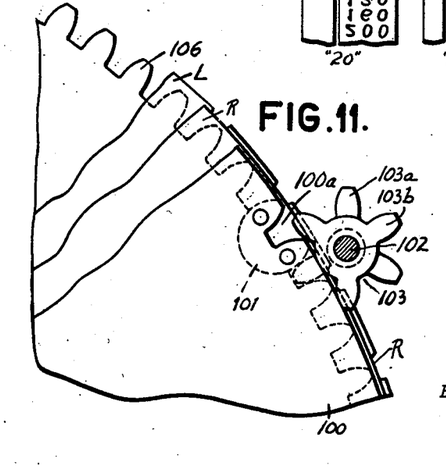
Fig. 11 is an enlarged, detailed side view of a portion of the Geneva carry means between type elements of one set.
Figure 12:
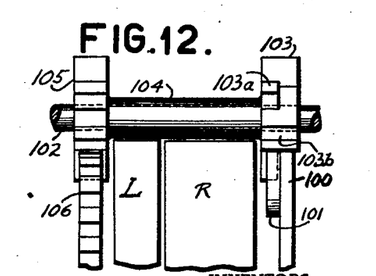
Fig. 12 is a rear view of this Geneva carry means.

The count capacity of the illustrated scale, when one piece is in the unit pan, is 500 pieces. There are 250 notches 47b in plate 47. The lowest notch corresponds to a count of 500 and the highest to a count of zero. When the count is 500, nut 60 is arrested on its lowest position and pawl 62a engages the lowest notch. When the count is zero, the nut travels to its highest position and engages the highest notch. Each notch, in descending order, thus corresponds to a count increment of 2 when one piece is in the unit pan. The gearing between shaft 95 and the nut 60 is such that in a complete travel of the nut from the lower limit to the upper limit, the shaft makes five revolutions. Since the complete travel of the nut corresponds to 500 pieces, each rotation of shaft 95 corresponds to 100 pieces. The type wheel R of set "1" carries types for printing the tens and units digits of the count. Since the notches 47b correspond to count increments of 2 pieces, fifty notches span a count range of 100. Accordingly, nut 60 may be arrested in any of fifty positions during its travel through the count range of 100. Correspondingly, type wheel R of set "1" will be arrested in any of fifty positions of its revolution corresponding to a count range of 100. For this reason, the type wheel R has fifty rows of type ranging from 00 to 98, in increments of two pieces. In the starting position, wheel R has its "00" type at printing position. The companion wheel L of set "1" has six types, i. e., 5, 4, 3, 2, 1, and 0. In starting position, the type 5 of this wheel L is in printing position. Thus, if the count is 500, nut 60 will be locked in its lowest position and the wheels L and R of set "1" will be in starting positions, with types 5 and 00 of the wheels in printing position. The count 500 will therefore be printed from the type wheels of set "1." When nut 60 moves from its lowest, 500 count position to the next higher position corresponding to a count of 498, the wheel R moves one-fiftieth of a revolution to place the type row 98 in printing position. During this movement of wheel R, it operates through carry means to move companion wheel L a distance such that the 5 type thereof is displaced from printing position and the 4 types brought to printing position. Thus, the wheels L and R of set "1" will be positioned to print count 498. The carry means for set "1" is shown in Figs. 9, 11 and 12 and is of the Geneva class. The carry means comprises a circular disk 100 fixed to the right side of the hub of wheel R of set "1." The periphery of disk 100 is interrupted by a single notch 100a. Fixed to the left side of disk 100 is a Geneva tooth element 101 having two teeth and a notch between them alined with notch 100a of the disk. Rotatably mounted on a fixed rod 102 behind shaft 95 is a carry pinion 103 having six teeth, three of which, designated 103a, are short and alternate with three longer teeth 103b. The teeth 103a do not extend the full width of the pinion, stopping just short of the disk 100. Pinion 103 is fixed to a sleeve 104 which rigidly carries a pinion 105 having six teeth. Pinion 105 is equal in size to pinion 103, and meshes with a gear 106 fixed to the left side of the hub of type wheel L of set "1."

When type wheel R of set "1" is moved one-fiftieth of a revolution to displace the "00" type row from recording position and bring the next type row "98" to the recording position, the notch 100a of disk 100 is in position to receive one of the long teeth 103b of pinion 103 while the upper side of the upper tooth of Geneva tooth element 101 engages a short tooth 103a and rotates the pinion 103. The pinion is rotated through a distance of two teeth before the long tooth moves out of notch 100a and the Geneva tooth element disengages the pinion. This condition is about to be attained in Fig. 11. During this rotation of the pinion 103, companion pinion 105 also moves through two teeth and actuates the meshed gear 106 through two of its teeth. Gear 106 has 100 teeth and it is thereby rotated by the carry means through one-fiftieth of a revolution, so that type wheel L fixed thereto has its 5 type displaced from printing position and its 4 type brought to printing position. In this manner, when wheel R of set "1" moves from its starting position in which the "00" type row is at printing position to the next position in which its 98 type row is in printing position, it effects carry movement of companion wheel L to bring its 4 type to the printing position. Thus, when nut 60 travels one step from its lowest position corresponding to a 500 count to its next higher position corresponding to a count of 498 with one piece in the unit pan, the type wheels L and I of set "1" are positioned to print 498 as the count.

Similar carries take place at the start of each new revolution of wheel R as the nut 60 moves from each even hundred count position to the next lower count position, so that wheel L is successively positioned with its 3, 2, 1, and 0 types at printing position as the count descends to 398, 298, 198, and 098.

Type wheel set "2" is used when two pieces are in the unit pan. The travel of nut 60 now corresponds to twice the count to which such travel is equivalent when only one piece was in the unit pan. Thus, with two pieces in the unit pan, the counting capacity is doubled and a maximum of 1000 pieces on the main platform may be counted. Likewise, the capacity of type wheel set "2" is from "00" to 1000. The wheel L of this set has types 10 to 0 in descending order. The wheel R of this set has fifty type rows comprising two duplicate successive series of types 96 to 00 in descending order. The travel of nut 60 from one notch 47b to the next which, with one piece in the unit pan, corresponded to two pieces in the main load now corresponds, with two pieces in the unit pan, to four pieces in the main load. Accordingly, each pair of successive types of wheel R of set "2" has a difference in value of "4." Since the complete travel of nut 60 from lowest to highest position now corresponds to a count difference of 1000 pieces and since wheels R make five revolutions for one such travel of the unit, each revolution of wheel R of set "2" corresponds to a difference of 200 pieces. Thus, each half revolution of the wheel R of set "2" corresponds to a count of 100 pieces and should result in a carry operation of wheel L of set "2". The carry means between the wheels R and L of set "2" is of the same construction as illustrated and described for set "1" but for set "2," the disk 100 will have two diametrically opposite notches such as 100a and will be provided with two Geneva tooth elements 101. Hence, carry will be effected for each half revolution of wheel R of set "2." In starting positions, wheel R of set "2" has its type "00" of the first series at printing position while companion wheel L has its type "10" at printing position. Thus, if the nut 60 is held at its lower limit, indicating the maximum count of 1000 with 2 pieces in the unit pan, the wheels of set "2" will remain in starting position to print 1000. When the nut travels upwardly to the next notch 47b, indicating a count of 996, wheel R of set "2" moves one step to locate the types "96" of the first type series at printing position. During this movement, it effects a carry step of companion wheel L which, thereby, brings its type "9" to printing position. The wheels are thus in position to print 996. When the nut 60 has moved a distance corresponding to a difference of 100 from the starting position, the wheel R of set "2" has the "00" type of the second type series at printing position. Now, if the nut moves further from 900 count position to 896 count position, the second half of the revolution of wheel R of set "2" begins and a second carry is effected to companion wheel L, bringing its type 8 to printing position. The wheels then are in position to print 896. Similar carries will take place each half revolution of the wheel R of set "2" until the wheels have their types 000 in printing position coincident with the arrival of nut 60 at the upper limit of its travel.

Set "5" is used when 5 pieces are in the unit pan. Each increment of travel of the nut now corresponds to 10 pieces. Accordingly, wheel R of set "5" has its successive types related to value increments of 10 pieces. The total capacity of the scale is now 2500 pieces. Each revolution of wheel R of set "5" covers a range of 500 pieces and five series of types 90, 80–10, 00 are provided on the wheel. Each fifth of a revolution of wheel R of set "5" effects a carry to the companion wheel L by means of carry elements such as described before. Obviously, the disk 100 of set "5" will have five equally spaced notches and Geneva tooth elements such as notch 100a and tooth element 101. Wheel L of set "5" has 25 types, ranging from "25" to "0".

Set "10" is used when 10 pieces are in the unit pan. The count capacity of the scale is then 5000 pieces and each step of travel of nut 60 corresponds to 20 pieces. Wheel R of this set has one series of types ranging from 000 to 980 in value increments of 20. Wheel L of set "10" has types 0 to 5 similarly to wheel L of set "1". Each revolution of wheel R of set "10" effects a carry step of wheel L through means such as described for set "1". The wheels L and R of set "10", at their starting positions, have their respective types 5 and 000 at the printing line. If wheel R moves one step further, its type 980 reaches the printing line, while wheel L is moved one carry step to locate its type 4 at the prtining line. The wheels then are in positions to print 4980.

Set "20" is used when 20 pieces are in the unit pan. Each increment of travel of nut 60 corresponds to a count of 40 pieces and the total travel corresponds to a count difference of 10,000 pieces. The wheel R of set "20" carries two series of types the same as wheel R of set "2" with the addition of a "0" as the right hand digit. Thus, each type row of wheel R of set "20" is a "ten" multiple of the alined type row of wheel R of set "2". The wheel L of set "20" is the same as wheel L of set "2" and carries thereto are similarly effected.

After printing operation has been effected in a manner described later, the nut 60 returns to its lower limit and the direction of rotation of type wheels R is reversed. During the reverse rotation of wheel R, they effect reverse carries to their companion wheels L to restore them to starting positions.

Below the type wheels, the frame carries guide plates 110 between which a record card or sheet is inserted by the operator to receive an imprint of the count value. An ink ribbon 111 is located above the upper guide plate 110. The guide plates are cut out directly below the type wheels, i. e., at the printing positions of the several sets of type wheels, so that printing hammers 112 may move through the cut-out portions of the guide plates to force the record sheet and ink ribbon against the types at printing position. There is one printing hammer 112 for each type wheel set, as indicated in Fig. 9. Associated with each hammer is a key lever 113, each of which will be suitably identified by a legend corresponding to the related type wheel set When a key is depressed, it is latched down by a common spring-urged bail 114 (Fig. 4). One arm of the bail is extended downwardly and pivotally connected to a bar 115. The right end of the bar has a slot 115a receiving a stud 116 provided on the lower arm of a three-armed lever 117. In a manner explained later, the lever 117 is rocked counterclockwise (Fig. 4) to cause printing operation to take place and after the print has been made, stud 116 engages the right hand end of slot 115a to move bar 115 to the right, thereby rocking bail 114 counterclockwise to unlatch the depressed key 113. When any of the keys is latched down, it holds an interponent bail lever 118, common to all the keys, in position to keep common key contacts 120 closed. These key contacts are in an initial energizing circuit of motor RM of the recording mechanism which circuit will be traced later. The right hand end of each key lever is provided with a stud 113a normally resting at the lower end of a vertical slot 121a formed in the lower end of a bar 121. The bars 121 are also formed at their upper ends with vertical slots through which a common, fixed rod 122 passes. Each bar 121, near its upper end has a lug 121b projecting normally above a shoulder on a by-pass pawl 123 carried by a lever 124. There is one bar 121, one pawl 123, and one lever 124 for each printing hammer 112. Each lever 124 pivotally mounts one printing hammer 112. The right hand end of the lever 124 is provided with a tab 124a underlying the printing hammer. A wire spring 125 presses the printing hammer clockwise (Fig. 4) to maintain it engaged with tab 124a. A spring 126 urges the lever 124 counterclockwise.

When a key lever 113 is depressed, its stud 113a moves upwardly and to the right. In so doing, it rocks associated bar 121 counterclockwise about rod 122, placing a shoulder 121c of the bar in the path of downward movement of a cross bar 117a which bridges arm 117b of lever 117 and a parallel arm (not shown) behind arm 117b. Thus, when lever 117 is rocked counterclockwise, bar 117a will strike shoulder 121a and depress bar 121 against resistance of a spring 127. Projection 121b of the bar 121 thereupon acts through by-pass pawl 123 to rock lever 124 and printing hammer 112 carried thereby clockwise, stretching spring 126. When bar 121 has traversed a part of its downward stroke, projection 121b slips off the coacting shoulder of pawl 123. As soon as this occurs, spring 126 relaxes and restores the lever 124 and printing hammer 112 counterclockwise. Lever 124 is stopped by a common rod 128 in its normal position, shown in Fig. 4, but the momentum of printing hammer 112 carries the hammer upwardly, beyond its normal position, to effect printing operation. During the final portion of the counterclockwise movement of lever 117, it acts through bar 115 to unlatch bail 114 from the depressed key lever 113. As a result, the shoulder 121c of bar 121 is withdrawn from the path of bar 117a and the bar restored to upper position by spring 127.

In the home position of the gearing of the recording mechanism, an element 129 carried by gear 90 abuts lever 130 of a toggle switch 131, thereby maintaining the switch in A position (Fig. 4). With the switch in A position, closure key contacts 120 will complete a circuit, traced later, to cause motor RM to run in a forward direction, driving gear 90 in the direction of the arrow. Further, with gear 90 in home position, a stud 132 projecting from a side of the gear abuts a spring blade 133 to hold contacts 134 open and contacts 135 closed. When the gear segment 93 departs from home position, it permits contacts 135 to open while contacts 134 close. Closure of contacts 134 establishes a reverse driving circuit for the motor RM, as will be further explained later in the circuit description.

Gear 90 pivotally carries an element 136 held by a spring 137 against a stud 138. When gear 90 has completed half a revolution in the forward direction, element 136 engages the upper arm of lever 117 and rocks the lever counterclockwise to effect in succession the printing operation and the release of the depressed key 113, in the manner explained before. Gear 90 moves further and the element 136 passes lever 117 and strikes the lever 130 of switch 131 to move it to position B. With the switch in position B, the circuit of motor RM is reversed and the gear 90 actuated in a return direction. As the gear completes its return to home position, element 129 engages lever 130 and returns switch 132 to A position. It may be noted that during the return movement of element 136, it may rock clockwise against the influence of spring 137, enabling it to return past the upper end of lever 117. Return of the gear 90 to home position also causes contacts 134 to reopen and contacts 135 to reclose.

The operation of the machine will be explained now in connection with the circuits.

*Circuits and operation*

Figure 13:
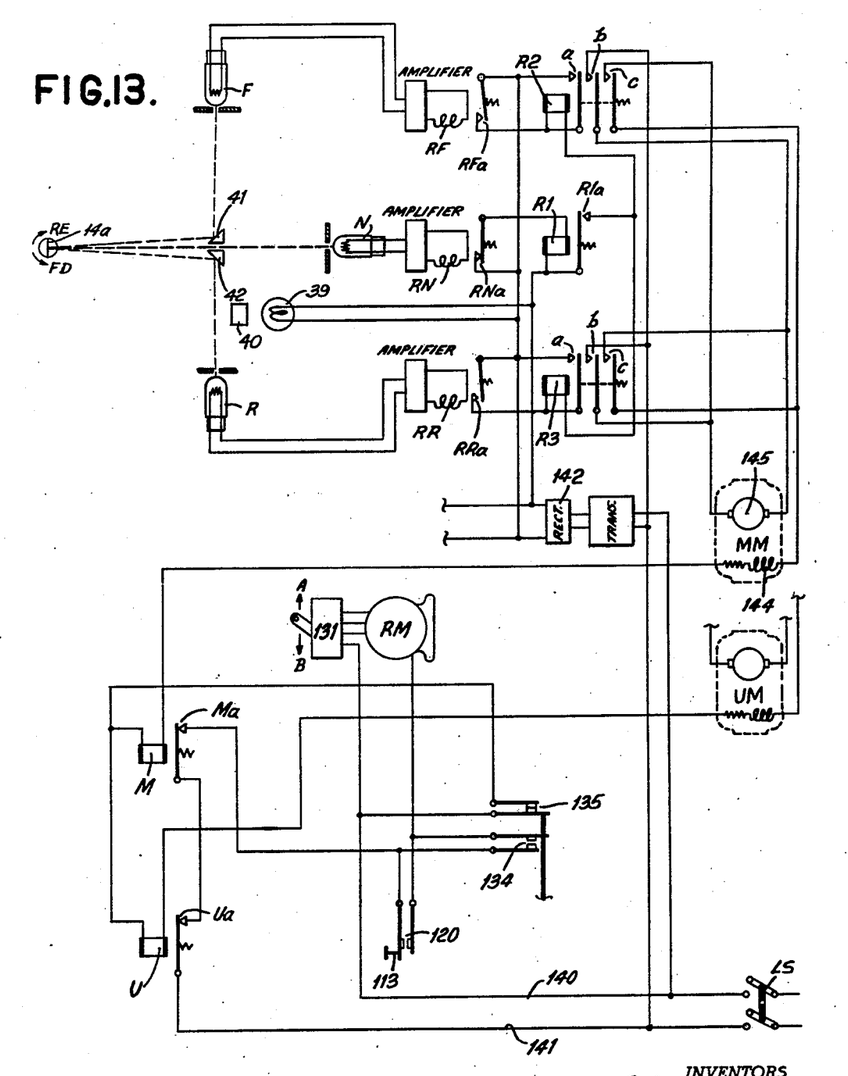
Fig. 13 is a circuit diagram.

Figure 13 shows the circuits of motor RM and the circuits, in full, of the main follower means. The circuits of the unit follower need not be shown in full as they are similar to those of the main follower means.

To prepare the machine for operation, line switch LS is first closed, supplying A. C. power to circuit lines 140 and 141. Certain relay coils of the follower means are of the D. C. type and for this reason, a rectifier 142 is connected through a transformer to lines 140 and 141.

With the main weighing mechanism in no-load position, the main follower is in matched relationship therewith and photocell N is activated. Photocell N, while activated, serves through a conventional amplifier to energize a relay coil RN. Coil RN closes relay contacts RNa to establish a circuit from one output line of rectifier 142, through contacts RNa and a relay coil R1 to the opposite output line of the rectifier. Coil R1 holds relay contacts R1a open. As will be made clear later, with contacts R1a open, a circuit through motor MM cannot be made. Thus, with a follower in matched relation to the associated weighing means, the follower motor is at rest.

Assume that a load is applied to the main weighing mechanism. The mirror 14a thereupon rocks in the forward direction FD indicated in Fig. 13, reflecting the beam of light, cast thereon by lamp 39 and condenser lens 40 to mirror 41. Mirror 41 redirects the light to photocell F. As cell F is actuated, related relay coil RF is energized, closing relay contacts RFa. Meanwhile, the cell N has been de-activated since mirror 14a no longer is reflecting light thereto. Accordingly, coil RN is inactive and its contacts RNa are open, deenergizing coil R1 so that contacts R1a return to normally closed position. With contacts R1a and RFa now closed, a circuit is completed from one output line of the rectifier via contacts RFa through relay coil R2 and via contacts R1a to the opposite output line of the rectifier. Coil R2 closes relay contacts R2a, b, and c. Closure of contacts R2a shunts contacts RFa to maintain coil R2 energized after contacts RFa open. Thus, if the main weighing mechanism moves forwardly out of matched relation with its follower, it will cause momentary operation of cell F to energize coil R2 which then remains energized until contacts R1a are reopened upon the follower regaining matched relation. With coil R2 energized, its relay contacts R2b and c establish the following circuit: From circuit line 140 via closed contacts 135 (see also Fig. 4), through a coil M, the field winding 144 of motor MM, thence via contacts R2c through the armature 145 of motor MM, then by way of contacts R2b to opposite circuit line 141. The direction of current afforded by this circuit through the armature of motor MM is such as to cause the motor to run in a forward direction, i. e., in a direction in which it actuates the main follower to follow the main weighing structure in an ascending load direction. It may be noted that this circuit includes contacts 135 so that unless these contacts are closed, the circuit cannot be established. Since contacts 135 are closed only when the drive means of the recording mechanism and, more particularly, gear segment 90 (Fig. 4) is in home position, it is impossible to establish the circuit of the follower motor MM unless the drive means of the recording mechanism is in home position. Thus, once recording operations are initiated, the follower motor cannot be set running, thereby preventing conflict between movement of the follower and travel of the nut 60 of the recording mechanism.

The motor MM when set running by the circuit last traced causes the main follower to move forwardly towards the load position of the main weighing mechanism. When the follower reaches the load position, it is again in matched relation to the main weighing mechanism. Accordingly, cell N is energized and contacts R1a open to break the circuit of coil R2. Contacts R2a, b, and c open and the circuit of motor MM is broken. The motor stops and the follower remains in matched relation.

When the main weighing mechanism and mirror 14a move in reverse direction RE indicated in Fig. 13, away from matched relation with the follower or when the follower, while moving forwardly overruns matched relation, cell N is de-activated and cell R is activated. With cell R activated, related coil RR is energized, closing contacts RRa to complete a circuit from one output line of the rectifier 142 via contacts RRa, relay coil R3, now-closed contacts R1a, and back to the opposite output line of the rectifier. Coil R3 closes contacts R3a, b, and c. Contacts R3a shunt contacts RRa to maintain coil R3 energized even though cell R may have been energized only momentarily. Contacts Rb and c establish a second motor circuit from line 140 via contacts 135, coil M, motor field 144, contacts R3c, motor armature 145, and contacts R3b to line 141. The direction of current through armature 145 afforded by the second motor circuit is opposite to the direction of current afforded by the first traced motor circuit. Accordingly, the second motor circuit causes motor MM to run in a reverse direction, moving the main follower in a descending load direction. As before, when the follower overtakes the main weighing mechanism and regains matched relation, cell N is activated and contacts R1a reopen, breaking the circuit of coil R3 which, in turn, causes the motor circuit to reopen.

In the same manner as described for the main follower, the unit follower motor UM is controlled by the intercontrols between the unit weighing mechanism and the unit follower to cause the unit follower to move in forward or reverse direction and to stop when matched relation is attained. The circuits of motor UM include a coil U connected in parallel with coil M, via contacts 135, to line 140. The purpose of the coils U and M is to prevent initiation of recording operations unless both followers are at rest. With either follower motor still running, its related U or M coil will be energized to maintain its contacts Ua or Ma open. These contacts are in series in the circuit of recording motor RM, to be traced later. Thus, the recording operations cannot be effected until the followers are at rest in the load positions and their index edges are crossing at a point corresponding to the count to be recorded.

Assuming both followers are at rest and a key lever 113 depressed to close common key contacts 120, a circuit of motor RM is established as follows: From line 140 via switch 131 in A position, through the motor RM, the key contacts 120, and via contacts Ma and Ua to opposite line 141. Motor RM is of the same type as motors UM and MM and with switch 131 in A position, the motor drives gear 90 in a forward direction; i. e., in the direction of the arrow, Fig. 4. As soon as gear 90 leaves home position, contacts 135 open and contacts 134 close. Contacts 134 shunt key contacts 120 for a purpose which will be made clear later. With gear 90 moving forwardly, gear 93 follows and drives the type wheel shaft 95 counterclockwise (Fig. 4). Through gears 96 and 97 (Fig. 1), the shaft 95 rotates shaft 53 (see also Fig. 3). Rotation of shaft 53 effects rotation of worm 57 to cause nut 60 to travel upwardly to the crossing point of the index edges of unit follower arm 82 and main follower plate 47. When the nut 60 reaches this crossing point, the nose of pawl 62 is forced into engagement with a notch 47b, positively arresting the nut in a position corresponding to an even graduation of the count. As nut 60 is arrested, type wheel shaft 95 also is stopped in a corresponding position and gear 93 is arrested. The gear 90, however, continues its forward movement, towards the end of which element 136 (Fig. 4) acts on lever 117 to cause the printing operation and the unlatching of the depressed key to take place in succession, as already explained. After this occurs, element 136 actuates lever 130 to set switch 131 in position B. Key contacts 120 are now open, but contacts 134 are closed and establish a second circuit for motor RM as follows: From line 140 via switch 131 in B position, through motor RM, contacts 134, contacts Ma and Ua, and to opposite line 141. The direction of current through the armature winding of motor RM afforded by the circuit with switch 131 in B position is opposite to the current directions with the switch in A position. Accordingly, motor RM is now running in a direction to effect counterclockwise movement of gear 90. When gear 90 has returned to its home position, all the related parts are also in home position and switch 131 is in A position. Both contacts 120 and 134 are now open and motor RM stops.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a computing scale in which two weighing mechanisms independently weight a pair of applied loads, means to compute a result dependent on both loads and comprising separate followers for the weighing mechanisms, each assuming a position dependent on the load applied to the associated weighing mechanism, means to coordinate the assumed positions of the followers including a device having a singly differential travel in a certain direction to a position determined by the separate positions of the followers and indicative of the result dependent on the pair of applied loads, and recording mechanism, including an element differentially positioned under control of said device, to record the said result.

2. In a computing scale in which two weighing mechanisms independently weight a pair of applied loads, means to compute a result dependent on both loads and comprising separate followers for the weighing mechanisms, each assuming a position dependent on the operation of the associated weighing mechanism and equivalent to the load applied thereto, means to correlate the separate assumed positions of the followers and including a device having singly differential travel in a certain direction to a position determined jointly by the separate positions of the followers and indicative of the result dependent on the applied loads, and means differentially positioned under control of the device to register said result.

3. In a computing scale in which two weighing mechanisms independently weight a pair of applied loads, means to compute a result dependent on the applied loads and comprising a pair of separate followers for the weighing mechanisms, means to move each follower under control of the associated weighing mechanism to a position equivalent to the load applied thereto, means for cooperatively relating the separate positions of the followers including a device having singly differential travel in a certain direction to a position indicative of the result, and printing means controlled by the device for printing an amount determined by the result position of the device.

4. In a computing scale in which two weighing mechanisms independently weight a pair of loads, means to compute a result dependent on the pair of loads and comprising a pair of separate followers for the weighing mechanisms, power drive means for moving each follower under control of the associated weighing mechanism to a position equivalent to the load applied to the latter mechanism, means for correlating the separate positions of the followers including a device arranged for singly differential travel in a certain direction to a position indicative of the result and means for moving the device under control of both followers to a result position determined by the separate positions of the followers, and printing means controlled by the correlating means for printing an amount determined by the result position of said device.

5. In a computing scale in which a pair of loads are each applied to one of a pair of independent weighing mechanisms to cause the weighing mechanisms to move proportionally to the applied loads to load positions, means to compute a result dependent on the two applied loads and comprising a pair of followers, one for each weighing mechanism, cooperating positioning control elements between each follower and associated weighing mechanism, automatic power means controlled by the control elements between each follower and associated weighing mechanism for moving each follower to a position corresponding to the load position of the associated weighing mechanism, a device arranged for singly differential travel in a certain direction to a result position determined by the separate positions of the followers, result recording means including a value registering member arranged to be moved differentially according to the result, and common actuating means for the device and the registering member for moving the device under control of both followers to the result position and concomitantly moving the registering member according to the result.

6. In a ratio scale in which weighing mechanism moves in response to an applied load to a load position corresponding to the magnitude of the applied load and in which unit mechanism is positioned according to a value increment, a main follower, means to move the main follower under control of the weighing mechanism to a position matching the load position, a unit follower, means to move the unit follower under control of the unit mechanism to a position matching the position of the unit mechanism, and means for determining the number of such value increments in the applied load and including a device to be moved to a result position indicative of the number of value increments in the applied load and means for moving the device under joint control of the main and unit followers and according to the separate positions of the followers to the result position.

7. In a computing scale to compute the count of load units contained in a main load and in which main weighing mechanism is operated according to the main load and unit factor mechanism according to the load unit, main and unit followers, means to position the main follower under control of the main weighing mechanism according to the main load, means to position the unit follower under control of the unit factor mechanism according to the load unit, means for coordinating the separate positions of the followers including a device positioned under joint control of the two followers according to the count, and means controlled by the coordinating means according to the position of the device for registering the count.

8. In a computing scale to compute the count of load units contained in a main load and in which main weighing mechanism responds to the main load to move to a position corresponding to the main load and in which unit load weighing mechanism responds to the load unit to move to a position corresponding to the unit load, a main follower for following the main weighing mechanism to a matching position corresponding to the main load, a unit follower to follow the unit weighing mechanism to a matching position corresponding to the unit load, means for coordinating the positions of the followers including a device positioned under conjoint control of the followers according to the count, and means controlled by the coordinating means according to the position of the device for registering the count.

9. In a computing scale, a pair of index members independently movable transversely to each other, each according to a separate variable, in intersecting paths to intersect at a point corresponding to a result value determined by both variables, a device having singly differential travel in a certain direction to the intersecting point of the index members, means for effecting such travel of the device under joint control of both index members to said intersecting point, and means controlled by said device for registering the result value corresponding to the said intersecting point.

10. In a computing scale, a pair of index members independently movable transversely to each other, each according to a separate variable, in intersecting paths to intersect at a point corresponding to a result value which is a function of both variables, a device arranged for singly differential travel in a certain direction to the intersecting point of the index members, automatic power means for effecting said travel of said device under automatic joint control of both index members, and means under control of said device for registering the result value corresponding to the intersecting point.

11. In a computing scale, a pair of index members independently movable transversely to each other, each according to a separate variable, in intersecting paths to intersect at a point indicative of a result value which is a function of both variables, a device arranged for singly differential travel in a certain direction to the intersecting point, result value printing means including type wheels and an operating shaft therefor, and common actuating mechanism for the device and for the said operating shaft for effecting said travel of the device to the intersecting point and concomitantly rotating the shaft in proportion to said travel.

12. In a computing scale, a pair of index members independently movable transversely to each other, each according to a separate variable, in intersecting paths to intersect at a point corresponding to a result value which is a function of both variables, and means for reading out the result value including a device carried by one of the index members, means to mount the device on its carrying index member for bodily movement therewith and also for movement relatively thereto towards the intersecting point and means for effecting such movement of the device relative to its carrying member to manifest the result value.

13. In a computing scale, a pair of index members independently movable transversely to each other, each accordingly to a separate variable, in intersecting paths to intersect at a point corresponding to a result value which is a function of both variables, and means for reading out the result value including a device carried by one of the index members, means to mount the device on its carrying index member to partake of the variable-dependent movement thereof and also to be movable relative to its carrying index member into engagement with the other index member to be arrested by the latter at the intersecting point whereby the device at such point manifects the result value, and means to effect said movement of the device relative to its carrying index member and into engagement with the other index member at the intersecting point.

14. In a computing scale, a pair of elongated index members movable independently and transversely to each other, each according to a different one of a pair of variables, to intersect at a point indicative of a result value which is a function of both variables, one of said index members being provided along its length with ratchet teeth spaced according to result value increments, and means for reading out result values including a device carried by the ratchet-toothed index member to partake of the variable-dependent movement thereof and also to move relatively to its carrying index member and lengthwise thereof to abut the other index member at the intersecting point, said device having a nose portion forced into engagement with one of said ratchet teeth by the latter index member upon is abutting the device, whereby the device is locked in a position indicative of the result value determined by the intersecting point, and means for effecting the movement of the device relatively to its carrying index member.

15. In a computing scale, a pair of index members movable independently, each according to a variable, in intersecting paths to intersect at a point corresponding to a result value which is is a function of both variables, and means for reading out the result value including a worm shaft journaled on and bodily supported by one of the index members to partake of the variable-dependent movement thereof, a nut coacting with the worm shaft to be moved by rotation of the shaft to the intersecting point to manifest the result value, and means including a drive connection carried by the shaft for rotating the shaft to effect the movement of the nut to the intersecting point.

16. In a computing scale, a rectilinearly movable index member moved according to a variable, an angularly movable index member moved according to another variable to intersect the rectilinearly movable index member at a point indicative of a result value which is a function of both variables, and means for reading out the result value including a worm shaft journaled on and bodily supported by the rectilinearly movable index member to partake of the rectilinear variable-dependent movement thereof, a nut coating with the worm shaft to be moved by rotation of the shaft to the intersecting point to manifest the result value, and means for rotating the shaft in any displaced position of the rectilinearly movable index member including a gear element carried by the shaft and a drive transmission for coacting with the gear element in any rectilinearly displaced position of the shaft.

17. In a computing scale in which measuring mechanisms are displaceable independently according to a pair of variables, a pair of followers for the measuring mechanisms mounted for movement transversely to each other to intersect at a point indicative of a result value which is a function of the two variables, automatic power means for moving each follower under control of the associated measuring mechanism to a position matching the variable-dependent displaced position of the associated measuring mechanism, a device arranged for singly differential travel in a certain direction to the intersecting point of the followers, result value registering means, and automatic drive means for moving the device under joint control of both followers to the intersecting point and for concomitantly moving the result value registering means in accordance with movement of the device so as to register the result value corresponding to the intersecting point of the followers.

18. The invention according to claim 17, and means for preventing operation of the automatic power means while the automatic drive means is in operation.

19. The invention according to claim 17, and means for preventing operation of the automatic drive means while the automatic power means is in operation.

ALFRED L. SPRECKER.
LEROY S. SMITHERS.

---

CERTIFICATE OF CORRECTION.

Patent No. 2,313,179.                    March 9, 1943.

ALFRED LE ROY SPRECKER, ET AL.

It is hereby certified that error appears in the printed specification of the above numbered patent requiring correction as follows: Page 8, first column, line 74, and second column, lines 15, 30 and 45, for "weight" read --weigh--; page 9, first column, line 12, for "whigh" read --which--; second column, line 46, for "accordingly" read --according--; page 10, first column, line 4, for "is" read --its--; and that the said Letters Patent should be read with this correction therein that the same may conform to the record of the case in the Patent Office.

Signed and sealed this 4th day of May, A. D. 1943.

(Seal)                               Henry Van Arsdale,
                                  Acting Commissioner of Patents.

CERTIFICATE OF CORRECTION.

Patent No. 2,313,179.  March 9, 1943.

ALFRED LE ROY SPRECKER, ET AL.

It is hereby certified that error appears in the printed specification of the above numbered patent requiring correction as follows: Page 8, first column, line 74, and second column, lines 15, 30 and 45, for "weight" read --weigh--; page 9, first column, line 12, for "whigh" read --which--; second column, line 46, for "accordingly" read --according--; page 10, first column, line 4, for "is" read --its--; and that the said Letters Patent should be read with this correction therein that the same may conform to the record of the case in the Patent Office.

Signed and sealed this 4th day of May, A. D. 1943.

(Seal)

Henry Van Arsdale,
Acting Commissioner of Patents.